United States Patent
Finis et al.

(10) Patent No.: US 9,916,359 B2
(45) Date of Patent: *Mar. 13, 2018

(54) INDEXING DYNAMIC HIERARCHICAL DATA

(71) Applicant: SAP SE, Walldorf (DE)

(72) Inventors: Jan Finis, Munich (DE); Robert Brunel, Heidelberg (DE)

(73) Assignee: SAP SE, Walldorf (DE)

(*) Notice: Subject to any disclaimer, the term of this patent is extended or adjusted under 35 U.S.C. 154(b) by 376 days.

This patent is subject to a terminal disclaimer.

(21) Appl. No.: 14/727,177

(22) Filed: Jun. 1, 2015

(65) Prior Publication Data

US 2016/0350380 A1    Dec. 1, 2016

(51) Int. Cl.
*G06F 17/30* (2006.01)

(52) U.S. Cl.
CPC .. *G06F 17/30504* (2013.01); *G06F 17/30327* (2013.01); *G06F 17/30333* (2013.01); *G06F 17/30589* (2013.01); *G06F 17/30613* (2013.01); *G06F 17/30619* (2013.01); *G06F 17/30625* (2013.01); *G06F 17/30631* (2013.01); *G06F 17/30961* (2013.01)

(58) Field of Classification Search
CPC ......... G06F 17/30327; G06F 17/30221; G06F 17/30961; G06F 17/30153; G06F 17/30315; G06F 17/30377; G06F 17/30362; G06F 17/30371; G06F 17/30575; G06F 17/30336; G06F 17/30625; G06F 17/30321; G06F 17/30333; G06F 17/30504; G06F 17/30631; G06F 17/30619; G06F 17/30613; G06F 17/30589

See application file for complete search history.

(56) References Cited

U.S. PATENT DOCUMENTS

| | | | | |
|---|---|---|---|---|
| 5,758,353 | A * | 5/1998 | Marquis | G06F 17/30961 707/744 |
| 6,175,835 | B1 * | 1/2001 | Shadmon | G06F 17/30327 707/696 |
| 6,301,579 | B1 * | 10/2001 | Becker | G06F 17/30592 |
| 6,424,967 | B1 * | 7/2002 | Johnson | G06F 17/30333 |
| 6,480,857 | B1 * | 11/2002 | Chandler | G06F 17/30595 707/792 |
| 6,675,173 | B1 * | 1/2004 | Shadmon | G06F 17/3061 |

(Continued)

OTHER PUBLICATIONS

"European Search Report", European Patent Office, dated Oct. 7, 2016 (Oct. 7, 2016), for European Application No. 16001198.7-1507, 9pgs.

(Continued)

*Primary Examiner* — Srirama Channavajjala
(74) *Attorney, Agent, or Firm* — Buckley, Maschoff & Talwalkar LLC (57) ABSTRACT

A system includes storage of data of a hierarchy, where each node of the hierarchy is represented by a row, and each row includes a level of its respective node, a pointer to a lower bound entry of an order index structure associated with the hierarchy, and a pointer to an upper bound entry of the order index structure associated with the hierarchy, reception of a pointer l, and determination of an entry e of the order index structure to which the received pointer l points.

14 Claims, 10 Drawing Sheets

(56) References Cited

U.S. PATENT DOCUMENTS

| | | | | |
|---|---|---|---|---|
| 6,986,102 | B1* | 1/2006 | Baer | G06F 17/30595 |
| | | | | 707/999.2 |
| 7,051,033 | B2* | 5/2006 | Agarwal | G06F 17/30917 |
| 7,401,185 | B2* | 7/2008 | Gaertner | G06F 12/0897 |
| | | | | 711/122 |
| 9,087,091 | B2* | 7/2015 | Raiber | G06F 17/30327 |
| 9,152,665 | B2* | 10/2015 | Finis | G06F 17/30356 |
| 9,280,575 | B2* | 3/2016 | Finis | G06F 17/30327 |
| 9,576,011 | B2* | 2/2017 | Finis | G06F 17/30327 |
| 2002/0095397 | A1* | 7/2002 | Koskas | G06F 17/30324 |
| 2003/0033285 | A1* | 2/2003 | Jalali | G06F 17/30595 |
| 2004/0117351 | A1* | 6/2004 | Challapalli | G06F 17/30286 |
| 2007/0050381 | A1* | 3/2007 | Hu | G06F 17/30324 |
| 2008/0010407 | A1* | 1/2008 | Gaertner | G06F 12/0804 |
| | | | | 711/118 |
| 2009/0157701 | A1* | 6/2009 | Lahiri | G06F 17/30327 |
| 2012/0078879 | A1* | 3/2012 | Shuma | G06F 17/30321 |
| | | | | 707/715 |
| 2012/0078942 | A1* | 3/2012 | Cai | G06F 17/30929 |
| | | | | 707/769 |
| 2014/0025708 | A1 | 1/2014 | Finis et al. | |

OTHER PUBLICATIONS

Brunel, Robert et al., "Supporting Hierarchical Data in SAP HANA", 2015 IEEE 31st International Conference on Data Engineering, Apr. 13, 2015 (Apr. 13, 2015), XP032781215, DOI: 10.1109/ICDE.2015.7113376, (pp. 1280-1291, 12 total pages).

Anonymous: "Data structures—Is a tree with nodes that have reference to parent still a tree?—Programers Stack Exchange", Sep. 29, 2014 (Sep. 29, 2014), XP055306158, retrieved from the Internet: URL:http://programers.stackexchange.com/questions/23146/is-a-tree-with-nodes-that-have-reference-t0-parent-still-a-tree, [retrieved on Sep. 28, 2016), 2pgs.

Amagasa, Toshiyuki et al., "QRS: A Robust Numbering Scheme for XML Documents", Proceedings of the 19th International Conference on Data Engineering (ICDE'03), IEEE, 2003, 1063-6382/03, (pp. 705-707, 3 total pages).

Boncz, Peter et al., "Updating the Pre/Post Plane in MonetDB/XQuery", Informal Proceedings of the Second International Workshop on XQuery Implementation Experience, and Perspectives (XIME-P), Jun. 16-17, 2015, 6pgs.

Brunel, Robert et al., "Supporting Hierarchical Data in SAP HANA", 2015, (pp. 1282-1291, 12 total pages).

Cai, Jing et al., "OrdPathX: Supporting Two Dimensions of Node Insertion in XML Data", DEXA 2009, LNCS 5690, 2009, (pp. 332-339, 8 total pages).

Chawathe, Sundarshan et al., "Meaningful Change Detection in Structured Data", 1997, 12pgs.

Cohen, Edith et al., "Labeling Dynamic XML Trees", SIAM J. Comput., vol. 39, No. 5, 2010, DOI: 10-1137/070687633, (pp. 2048-2074, 27 total pages).

Finis, Jan et al., "DeltaNI: An Efficient Labeling Scheme for Versioned Hierarchical Data", SIGMOD'13, Jun. 22-27, 2013, New York, New York, 12pgs.

Grust, Torsten et al., "Staircase Join: Teach a Relational DBMS to Watch its (Axis) Steps", Proceedings of the 29th VLDB Conference, Berlin, Germany, 2003, 12pgs.

Halverson, Alan et al., "Mixes Mode XML Query Proceesing", 2003, Proceedings of the 29th VLDB Conference, Berlin, Germany, 2003, 12pgs.

Haustein, Michael P. et al., "DeweyIDs—The Key to Fine-Grained Management of XML Documents", 2005, (pp. 1-15, 15 total pages).

Jagadish, H. V. et al., "Timber: A native XML database", The VLDB Journal (2002) 11, Digital Object identifier (DOI) 10.1007/s00778-002-0081-x, (pp. 274-291, 18 total pages).

Li, Changqing et al., "QED: A Novel Quaternary Encoding to Completely Avoid Re-labeling in XML Updates", CIKM'05, Oct. 31-Nov. 4, 2005, Bremen, Germany, 8pgs.

Li, Changqing et al., "Efficient Processing of Updates in Dynamic XML Data", 2006, 10pgs.

Li, Changqing et al., "Efficient updates in dynamic XML data: from binary string to quaternary string", 2008, The VLDB Journal, (pp. 1-26, 26 total pages).

Li, Quanzhong et al., "Indexing and Querying XML Data for Regular Path Expressions", Proceedings of the 27th VLDB Conference, Roma, Italy, 2001, (pp. 361-370, 10 total pages).

Min, Jun-Ki et al., "An Efficient XML Encoding and Labeling Method for Query Processing and Updates on Dynamic XML data", 2009, (pp. 1-29, 29 total pages).

O'Neil, Patrick et al., "ORDPATHs: Insert-Friendly XML Node Labels", SIGMOD 2004, Jun. 13-18, 2004, Paris, France, (pp. 1-6, 6 total pages).

Sasaki, Shigero et al., "Modularizing B+-Trees: Three-Level B+-Trees Work Fine", 2005, (pp. 1-12, 12 total pages).

Silberstein, Adam et al., "BOXes: Efficient Maintenance of Order-Based Labeling for Dynamic XML Data", 2005, 15pgs.

Tatarinov, Igor et al., "Storing and Querying Ordered XML Using a Relational Database System", ACM SIGMOD'2002, Jun. 4-6, 2002, Wisconsin, USA, 13pgs.

Xu, Liang et al., "DDE: From Dewey to a Fully Dynamic XML Labeling Scheme", SIGMOD'09, Jun. 29-Jul. 2, 2009, Providence, Rhode Island, USA, (pp. 719-730, 12 total pages).

Zhang, Chun et al., On Supporting Containment Queries in Relational Database Management Systems, AMC SIGMOD May 21-24, 2001, Santa Barbara, California USA, (pp. 425-436, 12 total pages).

* cited by examiner

| | |
|---|---|
| binary predicates | |
| is_descendant(a,b) | whether a is a descendant of b |
| is_child(a,b) | whether a is a child of b |
| is_before_pre(a,b) | whether a precedes b in a pre-order traversal |
| is_before_post(a,b) | whether a precedes b in a post-order traversal |
| node properties | |
| level(a) | the number of edges on the path from a root to a |
| is root(a) | whether a is a root node |
| is leaf(a) | whether a is a leaf node, i.e., has no children |
| traversal | {c is a cursor of the secondary index structure} |
| find(a) | a cursor c to node a |
| next_pre(c) | a cursor to the next node in pre-order |
| next_post(c) | a cursor to the next node in post-order |
| next_sibling(c) | a cursor to the next sibling |

*FIG. 3*

| Operation | Implementation |
|---|---|
| is_descendant(a, b) | $c \leftarrow find(a.lower)$; before(find(b.lower), c) ∧ before(c, find(b.upper)) |
| is_child(a, b) | is_descendant(a, b) ∧ level(a) == level(b) + 1 |
| is_before_pre(a, b) | before(find(a.lower), find(b.lower)) |
| is_before_post(a, b) | before(find(a.upper), find(b.upper)) |
| level(a) | a.level + adjust_level(find(a.lower)) |
| is_root(a) | level(a) == 0 |
| is_leaf(a) | $c \leftarrow find(a.lower)$; rid(next(c)) == rid(c) |
| find(a) | find(a.lower) |
| next_pre(c) | $n \leftarrow next(c)$; if lower(n) then n else next_pre(n) |
| next_post(c) | $n \leftarrow next(c)$; if ¬lower(n) then n else next_post(n) |
| next_sibling(a) | next(find(a.upper)) |

*FIG. 4*

| | |
|---|---|
| BULK UPDATES | |
| bulk_build(T) | bulk-builds the hierarchy from a tree representation T |
| LEAF UPDATES | alter a single leaf node |
| delete_leaf(a) | deletes a leaf node a |
| insert_leaf(a, p) | inserts the new leaf node a at position p |
| relocate_leaf(a, p) | relocates a leaf node a to position p |
| SUBTREE UPDATES | alter a subtree |
| delete_subtree(a) | deletes the subtree rooted in a |
| insert_subtree(a, p) | inserts the new subtree rooted in a at position p |
| relocate_subtree(a, p) | relocates the subtree rooted in a to position p |
| RANGE UPDATES | alter subtrees rooted in a range of siblings |
| delete_range([a, b]) | deletes all subtrees rooted in range [a, b] |
| insert_range([a, b], p) | inserts all subtrees rooted in range [a, b] at position p |
| relocate_range([a, b], p) | relocates all subtrees rooted in range [a, b] to position p |
| INNER NODE UPDATES | alter an inner node |
| delete_inner(a) | deletes node a from the hierarchy; the former children of a become children of a's parent |
| insert_inner(a, [b, c]) | inserts the new node a as child of the parent of b and c; nodes in range [b, c] become children of a |
| relocate_inner(a, [b, c]) | makes all children of a children of a's parent; a becomes the parent of all nodes in range [b, c], and the child of the previous parent of b and c |

INDEXING DYNAMIC HIERARCHICAL DATA

BACKGROUND

Many aspects of business operations inherently involve hierarchical data. For example, the reporting and geographical relationships between employees reflect hierarchical data structures. A relational database system operated by a business may therefore be required to maintain and query hierarchical data. However, due to the flat nature of the traditional relational model, most relational database systems do not provide efficient support for hierarchical data.

Relational database systems encode the structure of a hierarchy in tables such that a table row represents a hierarchy node. A primary challenge of such encoding is to provide a suitable combination of query performance without sacrificing update performance. This challenge is particularly acute in use cases involving a high rate of complex and possibly-skewed structural updates to the hierarchical data.

BRIEF DESCRIPTION OF THE DRAWINGS

FIG. 3 is a list of hierarchy query primitives according to some embodiments.

FIG. 4 lists implementations of hierarchy query primitives using index operations according to some embodiments.

DETAILED DESCRIPTION

The following description is provided to enable any person in the art to make and use the described embodiments. Various modifications, however, will remain readily apparent to those in the art.

Figure 1:
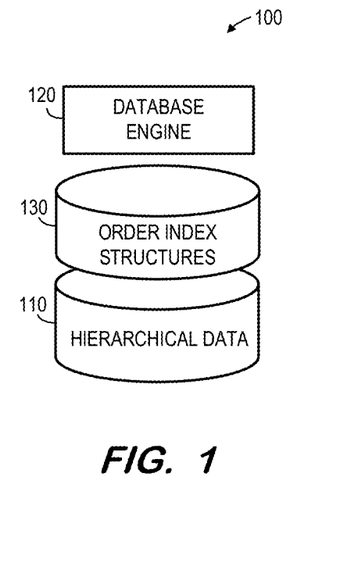
FIG. 1 is a block diagram of a computing system according to some embodiments.

FIG. 1 is a block diagram of database 100 according to some embodiments. FIG. 1 represents a logical architecture for describing systems according to some embodiments, and actual implementations may include more or different components arranged in other manners.

Database 100 may comprise any query-responsive data source or sources that are or become known, including but not limited to a structured-query language (SQL) relational database management system. Database 100 may comprise a relational database, a multi-dimensional database, an eXtendable Markup Language (XML) document, or any other data storage system storing structured and/or unstructured data. The data of database 100 may be distributed among several relational databases, multi-dimensional databases, and/or other data sources. Embodiments are not limited to any number or types of data sources. For example, database 100 may comprise one or more OnLine Analytical Processing (OLAP) databases (i.e., cubes), spreadsheets, text documents, presentations, etc.

Database 100 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database. In some embodiments, the data of database 100 comprises one or more of conventional tabular data, row-based data stored in row format, column-based data stored in columnar format, and object-based data. Database 100 may also or alternatively support multi-tenancy by providing multiple logical database systems which are programmatically isolated from one another. Moreover, the data of database 100 may be indexed and/or selectively replicated in an index to allow fast searching and retrieval thereof.

Database 100 may store metadata regarding the structure, relationships and meaning of the data stored within database 100. This information may include data defining the schema of database tables stored within database 100. A database table schema may specify the name of the database table, columns of the database table, the data type associated with each column, and other information associated with the database table.

Database engine 120 receives queries from database clients (not shown) and provides results to clients based on the data stored within database 100. Database engine 120 also performs administrative and management functions for database 100. Such functions may include snapshot and backup management, indexing, optimization, garbage collection, and/or any other database functions that are or become known.

Database 100 includes, among other data, hierarchical data 110. Hierarchical data 110 may include any type of hierarchical data that is or becomes known, not limited to the employee-related data mentioned above. Both the content of each node of hierarchical data 110 and the structure of the hierarchies defined by hierarchical data 110 may change from time to time. Some of hierarchical data 110 may be versioned, in that one or more past versions of a hierarchy are persisted in database 100.

Hierarchical data 110 is stored in relational tables, in which each row of a "hierarchical" table corresponds to a node in a hierarchy. According to some embodiments, the schema of each hierarchical table includes columns which specify, for each row (node) of the table, a lower bound, an upper bound, and a level. As is described and illustrated herein, the lower and upper bounds are not explicit numbers or other literals, but correspond to entries in an ordered data structure.

The lower bound and upper bound columns of a hierarchical table include pointers into one of order index structures 130. As referred to herein, an Order Index consists of the aforementioned three table columns and a corresponding order index structure. AO-Tree, BO-Tree and O-List implementations of order index structures will be presented below, but embodiments are not limited thereto. The pointers of the lower bound and upper bound columns are referred to herein as back-links, as they point back from a table row to an order index structure entry, while common secondary indexes point from an index entry to a row through its row ID (RID).

Figure 2:
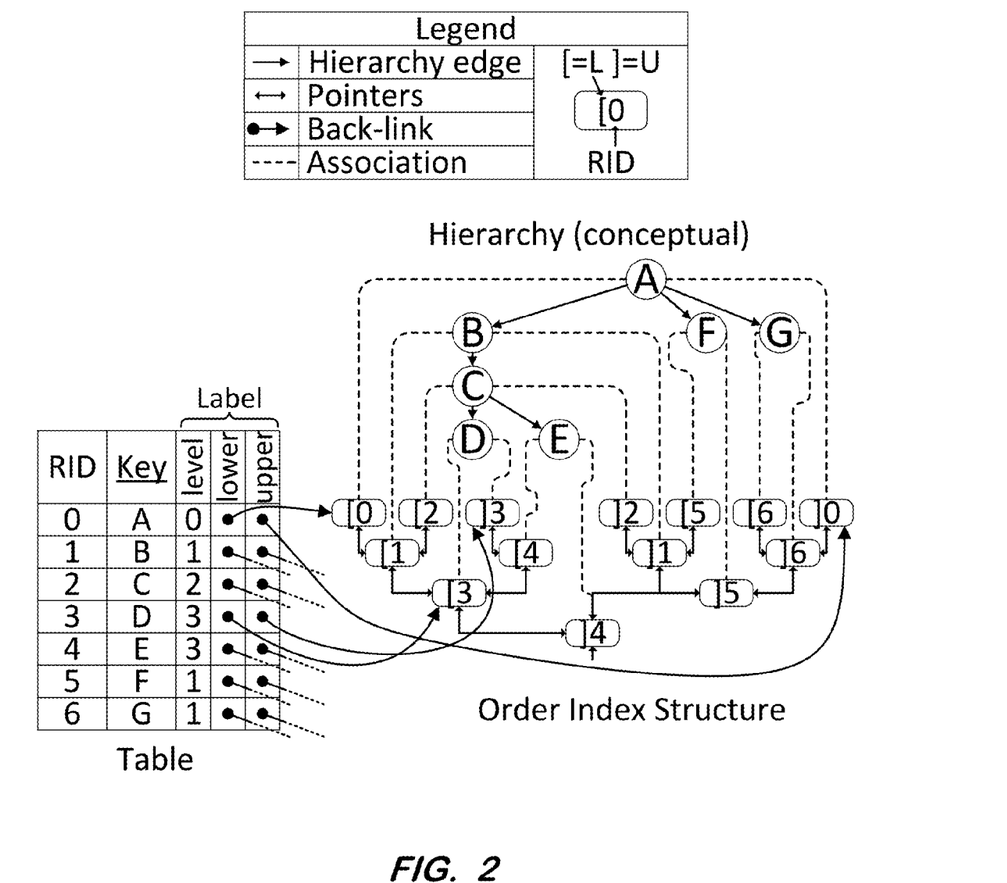
FIG. 2 illustrates a hierarchy and an order index according to some embodiments.

FIG. 2 illustrates a hierarchy including nodes A through G, represented by a hierarchical table including the three Order Index columns and a corresponding order index structure according to some embodiments. The order index structure is an AO-Tree, although embodiments are not limited thereto as will be explained below. A few exemplary backlinks pointing from a table row to an index entry are shown. An opening bracket denotes a lower bound and a closing bracket denotes an upper bound. For example, "]3" is the entry for the upper bound of row 3.

According to some embodiments, the order index structure maintains the relative order of its entries and provides the following operations (e is an index entry, l is a backlink):

find(l)—the entry e to which l points
rid(e)—the id of e's associated row
lower(e)—whether e represents a lower bound
before(e1, e2)—whether e1 is before e2 in the entry order
next(e)—the next entry in the entry order
adjust_level(e)—the level adjustment for e (see below)

Regardless of which type of order index structure is implemented (AO-Tree, BO-Tree, O-List, etc.), rid and lower can be implemented straightforwardly by storing a RID and a lower flag with each index entry, and next corresponds to a basic traversal of the data structure. Only adjust_level, find, and before differ among the three order index structure implementations described herein.

End-user queries on hierarchies commonly appear in business scenarios. Query primitives are the building blocks for such high-level queries. FIG. 3 shows a set of primitives that may be used alone or in combination with one another to answer many end-user queries. The "binary predicates" compare two nodes and may be used for self-joining the hierarchy to navigate along certain axes. Most queries navigate along the axes is_descendant and is_child. is_before_pre and is_before_post are useful for ordering nodes in a depth-first manner, either parent-before-child (e.g., document order in XML) or child-before-parent. "Node properties" are used to filter nodes, for example, if a user wishes to restrict a result to leaf nodes or to nodes at certain levels. "Traversal" operations are useful to implement an index-nested-loop join or an index scan. Such an operation commonly starts with a find, that is, a determination of the position of a node in an index structure. From there, the traversal operations may be used to scan the index structure in various directions.

As shown in FIG. 4, the query primitives of FIG. 3 may be implemented in terms of the six index operations described above.

Figure 5:
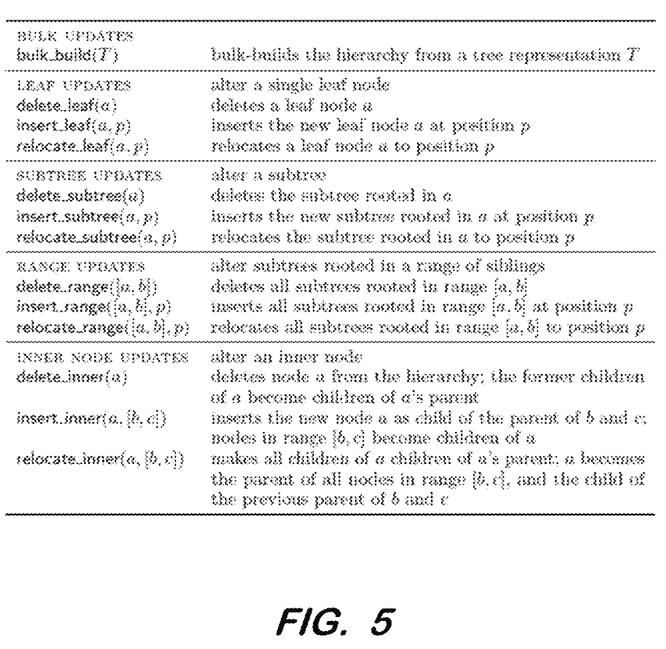
FIG. 5 lists hierarchy update operations according to some embodiments.

An order index according to some embodiments also supports efficient update operations. FIG. 5 lists update operations that a dynamic indexing scheme shall support. p indicates a target position in the hierarchy. Depending on whether the sibling order is meaningful, p can have different values, such as "as first child of node x", "as direct left sibling of x", "below x", or "as a sibling of x". The syntax [x,y] denotes a sibling range of nodes: y must be a right sibling of x (or x itself), and [x,y] refers to all siblings between and including x and y.

The first listed class of update operations is bulk-building a hierarchy. The other classes are leaf node updates, subtree updates, sibling range updates, and inner node updates, each named after the entities involved in the update. Within each class, three types of update are considered: delete updates, which delete existing nodes, insert updates, which insert new nodes, and relocate updates, which alter the positions of existing nodes.

Figure 6:
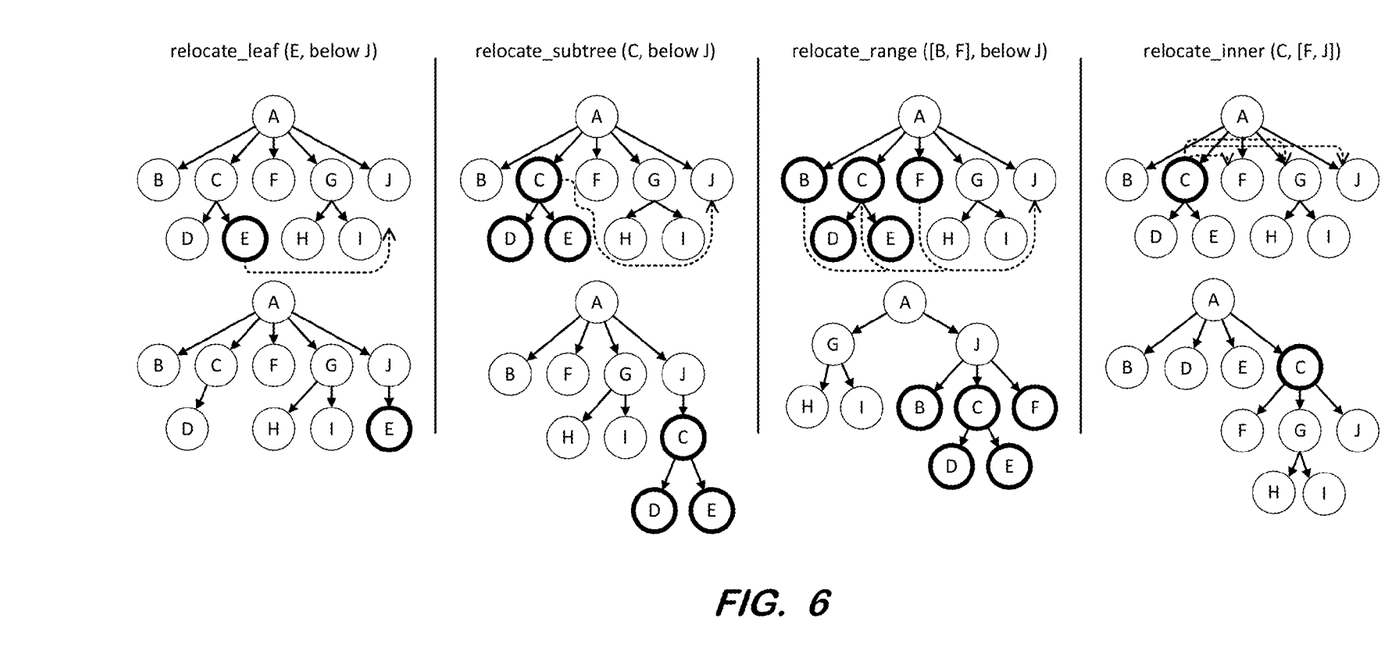
FIG. 6 illustrates hierarchy update operations according to some embodiments.

FIG. 6 illustrates the various classes of update operations with regard to the relocate type on an example hierarchy. The other types, insert and delete, are similar; the primary difference is that the entities being updated (bolded in FIG. 6) enter or leave the hierarchy, respectively, instead of being relocated. Thus, any index that efficiently handles relocation supports efficient insertion and deletion as well.

Some embodiments focus on subtree updates. As a leaf node is also a trivial subtree, they subsume the corresponding leaf updates. However, since indexing schemes usually afford optimized operations for leaves, distinguishing between leaf and subtree operations is useful in practice. Most indexing schemes implement subtree operations natively through node-by-node processing, requiring at least s leaf updates for a subtree of size s, at an update cost of $\Omega(s)$.

Order indexes according to some embodiments may efficiently implement the above-described hierarchy update operations. For example, insert_leaf corresponds to inserting a lower bound and an upper bound as adjacent entries into an order index structure and storing the back-links and an initial level in the corresponding table row. delete_leaf removes the two entries from the order index structure and the table row. To implement relocate_range, the corresponding range of bounds [a,b] is conceptually "cropped", then the level adjustment (i.e., the value returned by adjust_level) is altered for that range, and [a,b] is reinserted at the target position. The other update operations are implemented in terms of these operations.

Level adjustments enable level information to be maintained dynamically. adjust_level may be added to the level stored in the table row (cf. level(a) in FIG. 4). This may avoid having to alter the table in case of a range relocation; rather, level adjustment of the relocated range is updated. Accumulation works for any hierarchically organized data structure that stores its entries in blocks, such as a B-tree or a binary tree (where the "blocks" are just nodes). According to some embodiments, a block level is stored with each block. The level adjustment of an entry e is obtained by summing up the levels of all blocks on the path from e's block to the root block. This allows efficient altering of levels during a range relocation: After cropping the bound range [a,b], the desired level delta δ is added to the block level of the root block(s) of that range, which effectively adds δ to the levels of all entries within [a,b]. Accumulation results in the cost that level(a) becomes linear in the height of the data structure, usually O(log n). However, during an index scan, the level adjustment can be tracked and could be refreshed only when a new block starts.

Specific implementations of order index structures will now be described, including an AO-Tree based on a keyless AVL tree, a BO-Tree based on a keyless B+-tree, and an O-List based on a linked list of blocks. Embodiments are not limited to these implementations.

AO-Tree: Self-balancing binary trees, such as the AVL tree or the red-black tree, offer logarithmic complexity for most operations, which makes them good candidates for an Order Index structure. Pointers to parent nodes are maintained because the implementing algorithms navigate from the bottom towards the root rather than from the root to the bottom. To compute adjust_level, for example, all block levels on the path from an entry to the root are summed, as outlined above. Since the trees are balanced, the worst-case complexity for navigating upwards is O(log n).

Figure 7:
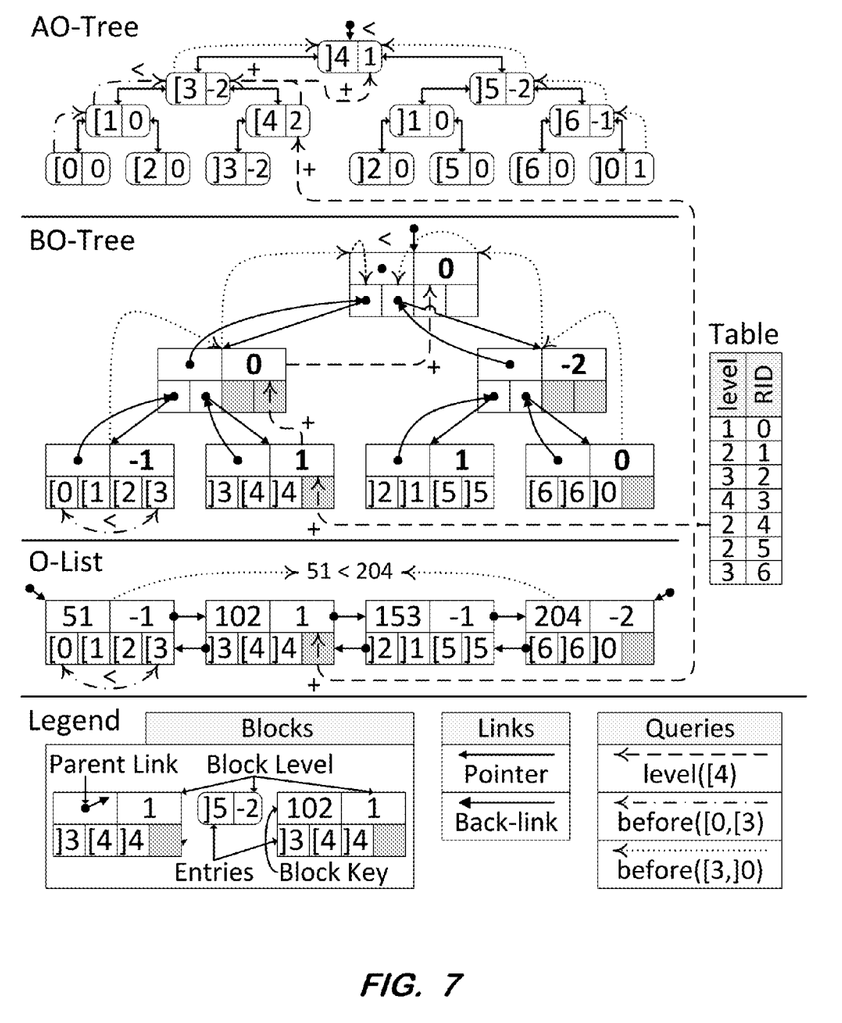
FIG. 7 illustrates query evaluation using different order index structures according to some embodiments.

The top of FIG. 7 shows the AO-Tree order index structure of FIG. 2 in more detail. The smaller numbers to the right of the lower and upper-bound entries are the block levels. The dashed arrows labeled "+" show how to evaluate level for node 4 (i.e., level([4)). That is, start with the value 2 from the table row #4 (illustrations of back-links are omitted) and sum up the block levels from [4 upwards to obtain 2+2−2+1=3.

The entry order relation before($e_1$, $e_2$) is checked by simultaneously walking up the tree, starting at $e_1$ and $e_2$, to their least common ancestor e', and finally checking which of the two paths arrives at e' from the left. In FIG. 4, is_descendant(3,0) is evaluated by checking before([0,[3) (dash-dot arrows) and before([3,]0) (dotted arrows).

Leaf updates correspond to basic binary tree insert and delete operations, with rebalancing if necessary. Range relocations are implemented in terms of the O(log n) operations split and join: split splits a binary tree into two, while join concatenates two binary trees. relocate range([a,b],p) is performed by first splitting the tree before [a and behind]b into a tree $T_1$ containing all entries smaller than [a, a tree $T_2$ containing the range [a,b], and a tree $T_3$ containing all entries greater than]b. We then apply the desired level delta δ to the root of $T_2$; join $T_1$ with $T_3$; split the resulting tree at p, resulting in trees $T_4$ and $T_5$; and finally join the remaining trees in the order $T_4$, $T_2$, $T_5$.

Using a binary tree may in some circumstances require significant memory for storing three pointers (left, right, parent) and a block level per entry; and, as its entries are scattered in memory, a traversal will usually incur many cache misses.

BO-Tree: B+-trees are based on blocks of size B rather than single-entry nodes, which may improve their cache-friendliness over binary trees. A BO-Tree can be implemented by adapting a B+-tree as follows: each block additionally maintains a back-link to its parent block and a block level. In an inner block there are no separator keys but only child block pointers. An entry in a leaf block consists of a row ID and a lower flag. Most B+-Tree operations, including splitting and rebalancing, need almost no adaptions. Key search is no longer required since BO-Trees are keyless and the table stores back-links to leaf entries rather than keys. Back-links to parent blocks are used, because most operations involve leaf-to-root navigation. adjust_level(e), for instance, is computed by summing up all block levels on the path from e's leaf block to the root.

The middle order index structure of FIG. 7 shows a BO-Tree indexing the hierarchy of FIG. 2. Back-links are displayed as solid curved arrows, block levels as bold numbers. The dashed arrows labeled "+" illustrate the level query for node 4: sum up the table level and the block levels on the path from [4 to the root, yielding 2+1+0+0=3.

Since the tree height is in $O(\log_{Bn})$, that is the worst- and best-case complexity for computing the level. The wider the blocks in the BO-Tree, the faster level can be computed. Note that a level query does not need to locate the corresponding entry within its block; only the block level is accessed.

before($e_1$,$e_2$) is evaluated as follows: If $e_1$ and $e_2$ are located in the same leaf block, their positions within that block are compared. Otherwise, walk up the tree to the least common ancestor lca of the two blocks containing $e_1$ and $e_2$ then determine which of the two paths enters lca from further left, by comparing the positions of the two corresponding pointers to the children through which the paths pass.

For example, in the BO-Tree of FIG. 7, entries [0 and [3 are on the same leaf block, so their positions are compared (dash-dot arrows). To evaluate before([3,]0), walk up to the least common ancestor, which happens to be the root block (dotted arrows). The [3 path enters the root through child 0 and the]0 path enters through child 1, so [3 is indeed before]0.

To determine the position of a block within its immediate parent block, and to locate an entry within its leaf block, that block is scanned linearly. However, the before algorithm needs to determine the child positions within the lca block, but not within any of the other blocks on the path to lca. In the before([3,]0) case, for example, neither the positions of $e_1$ and $e_2$ within their leaf blocks nor the positions of the leaf blocks within their parents are needed. Thus, only one linear block scan is needed per query, rather than one per visited block. Therefore, the worst case-complexity is O(B) for the scan and $O(\log_{Bn})$ for moving up the tree, so $O(B+\log_{Bn})$ overall (rather than $O(B\log_{Bn})$). If we choose a large B, the query time will be dominated by B.

Leaf updates correspond to simple B+-tree insertions or deletions without prior key search and have an amortized runtime of O(1). relocate range([a, b],p) is performed as follows: 1) Simultaneously split blocks upwards starting from the positions of [a and]b within their respective leaf blocks. As soon as the least common ancestor block is reached, crop out the entry range between the two split child blocks and place it into a newly allocated block. This results in a cropped-out tree $T_1$ containing the entry range from [a to]b and a tree $T_2$ containing all other entries. If a level delta δ is to be applied, adjust $T_1$ root block level by δ. 2) Rebalance blocks split in Step 1 to get rid of blocks which include less than a predefined percentage (e.g., 50%) of entries. For purposes of the present description, these blocks will be referred to as "less-than-full" blocks. 3) Split $T_2$ starting at the leaf block of p and continue to split upwards until reaching a block L that is higher than the root of $T_1$; the height of $T_2$ may have to be increased during this step to obtain L. 4) Now, insert $T_1$ as a new child block of L. 5) Rebalance blocks split in Step 3.

Figure 8:
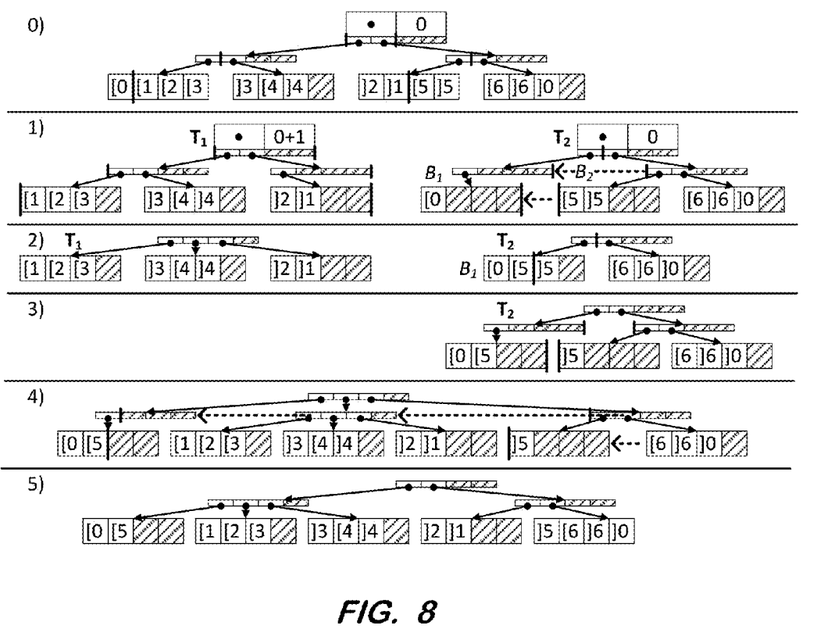
FIG. 8 illustrates relocation of a node in a BO-Tree implementation according to some embodiments.

For example, FIG. 8 shows how the subtree rooted in node 1 is relocated below node 5 in the example BO-Tree. Back-links and block levels are omitted, except for the root). After $T_1$ is cropped out (represented by dark vertical lines at steps 0) and 1)), δ=+1 is applied to its root, since the target parent 5 is one level higher than the old parent 0. The trees are rebalanced (dashed arrows), which shrinks $T_2$. Now $T_2$ is split behind [5 to create a gap for $T_1$ (dark vertical lines at steps 2), 3) and 4)). This increases its height by one. Now, $T_1$ is added as second child of the new root of $T_2$. Less-than full nodes are then rebalanced for a properly balanced result.

When entries are moved from a block $B_2$ to another block $B_1$ during rebalancing, their level is adjusted by $B_2$.level—$B_1$.level. If $B_1$ and $B_2$ are inner blocks, the values to be adjusted are the block levels of their child blocks. If $B_1$ and $B_2$ are leaf blocks, the values to be adjusted are the level fields in the table, but only for lower bound entries.

Figure 9:
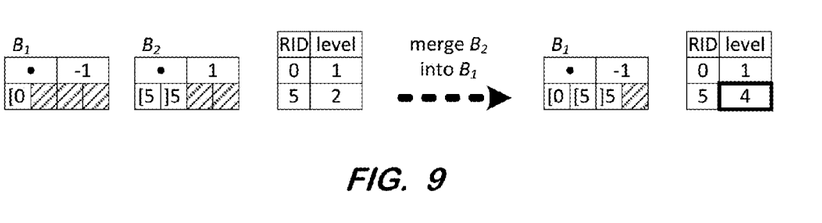
FIG. 9 illustrates adjustment of levels after a leaf block merge according to some embodiments.

For example, FIG. 9 illustrates the merging of the two leaf blocks $B_1$ and $B_2$ from FIG. 8. Entry [5 is moved to $B_1$, so its table level becomes 2+1−(−1)=4. No level update is performed for]5 because it is an upper bound.

In a worst case, two block splits are performed per level up to the least common ancestor and as many block merges are performed for rebalancing, so up to $O(\log_{Bn})$ splits and merges are performed in total. Each block split and merge touches O(B) entries in the worst case. Thus, the overall worst-case complexity of range relocation is $O(B\log_{Bn})$. The smaller the relocated range, the higher the chance that the least common ancestor block has a lower height. So, relocation is faster for small ranges; $O(B\log_{BS})$ in the best case.

While a large block size B may speed up queries, it slows down updates. However, since leaf blocks are updated more frequently than blocks further up in the tree, the BO-Tree may be enhanced with support for blocks of different sizes at different levels. Using small leaf blocks and larger inner blocks may result in a tree that updates almost as fast as trees with small B but queries almost as fast as trees with large B.

O-List: Unlike AO-Tree and BO-Tree described above, the O-List is not a tree structure but merely a doubly linked list of blocks. The bottom order index structure of FIG. 7 shows an O-List for the example hierarchy. Block keys encode the order among the blocks. Block keys are integers that are assigned using the whole key universe, while leaving gaps so that new blocks can be inserted between two blocks without having to relabel any existing blocks, as long as there is a gap.

Each O-List block maintains a block key and a block level field for the level adjustment. The blocks are comparable to BO-Tree leaf blocks without a parent block, and may be treated in a similar manner: Inserting into a full block triggers a split; a block whose load factor drops below a certain percentage (40%, for example) is either refilled with entries from a neighboring block or merged with it. When moving entries from one block to another, their levels are adjusted (cf. FIG. 9). adjust_level(e) simply returns the level of e's block. before(a,b) first checks if a and b are in the same block; if so, it compares their positions in the block, if not, it compares the keys of their blocks.

For example, FIG. 7 illustrates computation of the level of node 4 by adding the block level 1 to the table level 2. before([0,[3) corresponds to an in-block position comparison. before([3,]0) holds because the block key 51 of [3 is less than the block key 204 of]0.

As both adjust_level and before reduce to a constant number of arithmetic operations, they are in O(1), which makes them even faster than for the BO-Tree. But the improved query performance comes at a price: While leaf updates have O(1) amortized average-case time complexity, leaf insertion has a linear worst-case complexity. If a block overflows, it is split into two, and the new block needs an appropriate key. If no gap is available, the keys of all blocks are relabeled, yielding equally spaced keys again. For a block size of B, there are O(n/B) blocks, so the complexity of relabeling is O(n/B). Splitting a block is in O(B). Therefore, the worst-case complexity of a leaf insertion is O(n/B+B).

Figure 10:
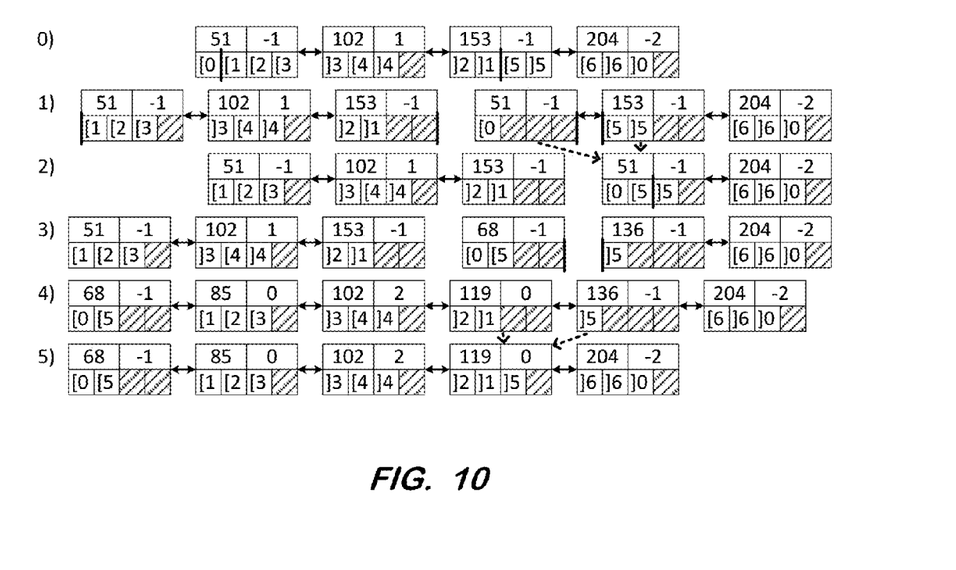
FIG. 10 illustrates relocation of a node in an O-List implementation according to some embodiments.

Range relocations are performed similarly to the BO-Tree, with the difference that only one level of blocks is split and rebalanced and the block keys of the moved bound range are updated. For example, FIG. 10 shows the relocation of subtree 1 under node 5. With reference to the labeled steps of FIG. 10: 1) The block range for node 1 is cropped out (dark vertical lines in steps 0) and 1)). 2) Less-than-full block 51 is merged with block 153. 3) The list is split after [5, and the block keys of the split blocks are updated to fill the gap evenly. 4) The cropped block range is linked in and its block levels and keys are updated: 1 is added to all block levels. The gap between block 68 and block 136 fits the three blocks, so their keys are relabeled to divide it evenly. 5) Less-than-full block 136 is merged with block 119.

Splitting and merging blocks is in O(B); relabeling all cropped blocks is in O(s/B). Thus, the runtime of subtree relocation is in O(s/B+B) if the gap fits the cropped range. Otherwise a total relabeling is performed, yielding O(n/B+B) worst-case runtime. Although the runtime is linear in s, or even linear in n when relabeling, the O-List still performs well in practice, with a strong point being the divisor of B in the complexity. By choosing a sufficiently large B, e.g., 256 or 1024, the cost of relabeling may be minimized to a point where relabeling becomes feasible even for very large hierarchies. Small and average-size subtrees span only a few blocks in such O-Lists, so relocating them may be very efficient.

The O-List order index structure mitigates the relabeling problem in two ways: not only does it reduce the time a relabeling takes by factor B, it also multiplies the minimal number of inserts that can possibly trigger a relabeling by that factor. When insertions happen in a less skewed manner, relabeling will rarely ever be triggered. To increase robustness even further, a wider data type for block keys (e.g., 128-bit integers) can be chosen without sacrificing too much memory, since only one key per block is required. A variable-length encoding could be used to avoid relabeling altogether. However, variable-length encodings are less processing-friendly than fixed-size integers, and relabeling happens rarely in sane scenarios.

An implementation of find(l), will now be discussed. find(l) locates an entry in the order index structure given a back-link l. Apart from locating entries, back-links are also used in the BO-Tree to look up positions of child blocks within their parent.

The implementation of find(l) depends on how back-links are actually represented. This is trivial for the AO-Tree: direct pointers to the AVL tree nodes can be used, as they never move in memory. For the BO-Tree and the O-List, however, entries are shifted around within their blocks or even moved across blocks by rotate, merge, and split operations. In these cases, any pointers to the entries would have to be adjusted. This causes a significant slowdown through random data access, as adjacent entries in blocks do not necessarily correspond to adjacent table tuples (i.e., hierarchy indexes are secondary indexes).

Figure 11:
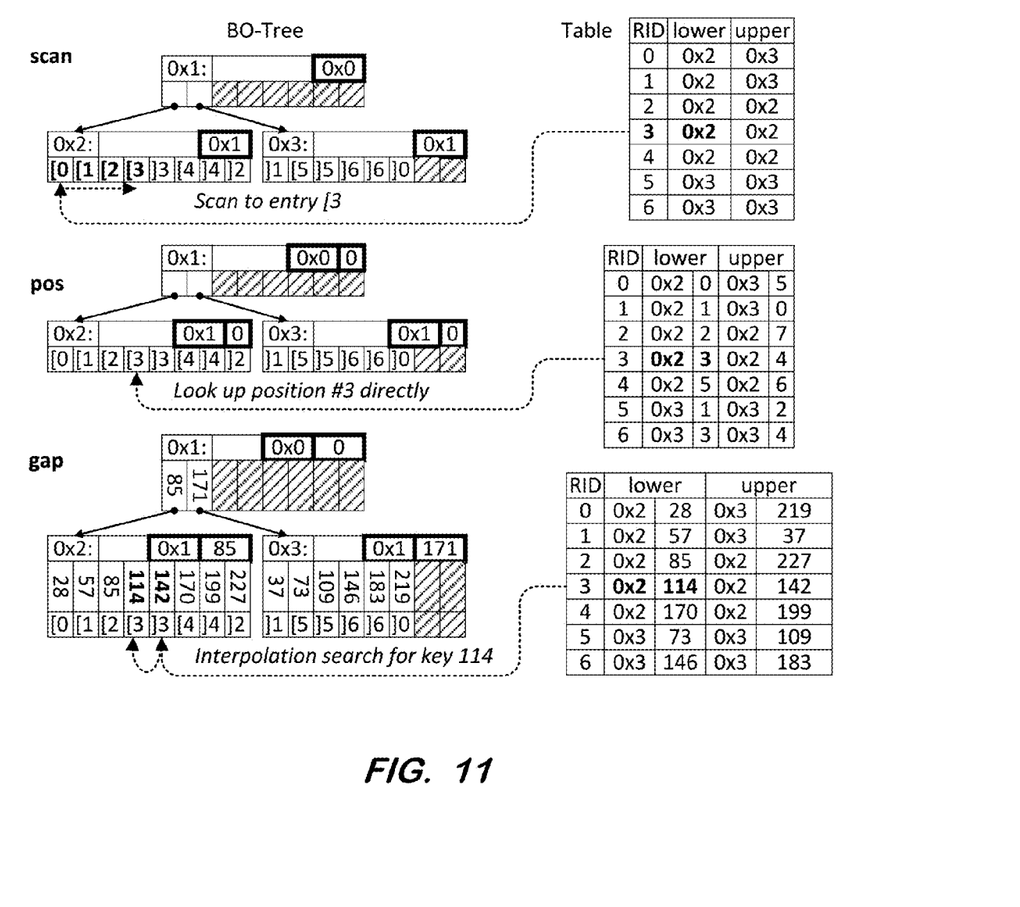
FIG. 11 illustrates three strategies for finding an entry in a BO-Tree according to some embodiments.

FIG. 11 illustrates three strategies for finding entry [3 in a BO-Tree (shown on the left), with each strategy corresponding to one approach for representing back-links in these data structures: scan, pos, or gap. The relevant contents of the table are shown on the right. The address of a block is shown in its top-left corner. The table and block entries that are touched by find are highlighted in red.

In the scan approach, back-links point only to the block containing the entry, which is scanned linearly for the row's ID to locate the entry. scan has the advantage that only entries that are migrated to another block during merges, splits, and rotations need their back-links updated. However, linear block scans add an unattractive O(B) factor to most queries and thus hinder the use of larger blocks.

pos represents back-links by a block pointer and the offset in the block. While this eliminates the O(B) factor and grants O(1) find performance, it necessitates relabeling even when an entry is only shifted around within its block. As any insertion or deletion in a block involves shifting all entries behind the corresponding entry, this slows down updates considerably, especially for a larger B.

In the gap approach, each entry is tagged with a block-local key (1 byte in the example) that is unique only within its block. A back-link consists of a block pointer and a key. Initially the keys are assigned by dividing the key space equally among the entries in a block. When an entry is inserted, it is assigned the arithmetic mean of its neighbors; if no gap is available, all entries in the block are relabeled. The block-local keys are used to locate an entry using binary search or interpolation search. Interpolation search is beneficial, as block-local keys are initially equally spaced and thus amenable for interpolation. A block may even be relabeled proactively once an interpolation search takes too many iterations, since this is a sign for heavily skewed keys. The occasional relabeling makes gap significantly cheaper than pos, which effectively relabels half a block, on average, on every update. Frequent relabelings are not a serious problem, as they are restricted to a single block of constant size B.

For BO-Tree order index structure implementations, a multi-level scheme in which block size B depends on block level may prove beneficial. For example, the assigned sizes may be 16 for leaf blocks, 64 for height 1 blocks, and 256 for height 2 blocks and above. Using BO-Tree with mixed block sizes may provide an excellent all-round index structure with full robustness for all update operations, particularly when the update pattern is unknown.

O-List with sufficiently large block size may outperform BO-Tree in queries by around 50%, but is less robust in dealing with skewed insertions and relocations of large subtrees and ranges.

Concerning the back-link representations, pos representations may be preferable for small B and scenarios with few updates, while gap representations may be preferable for larger B and dynamic scenarios.

Figure 12:
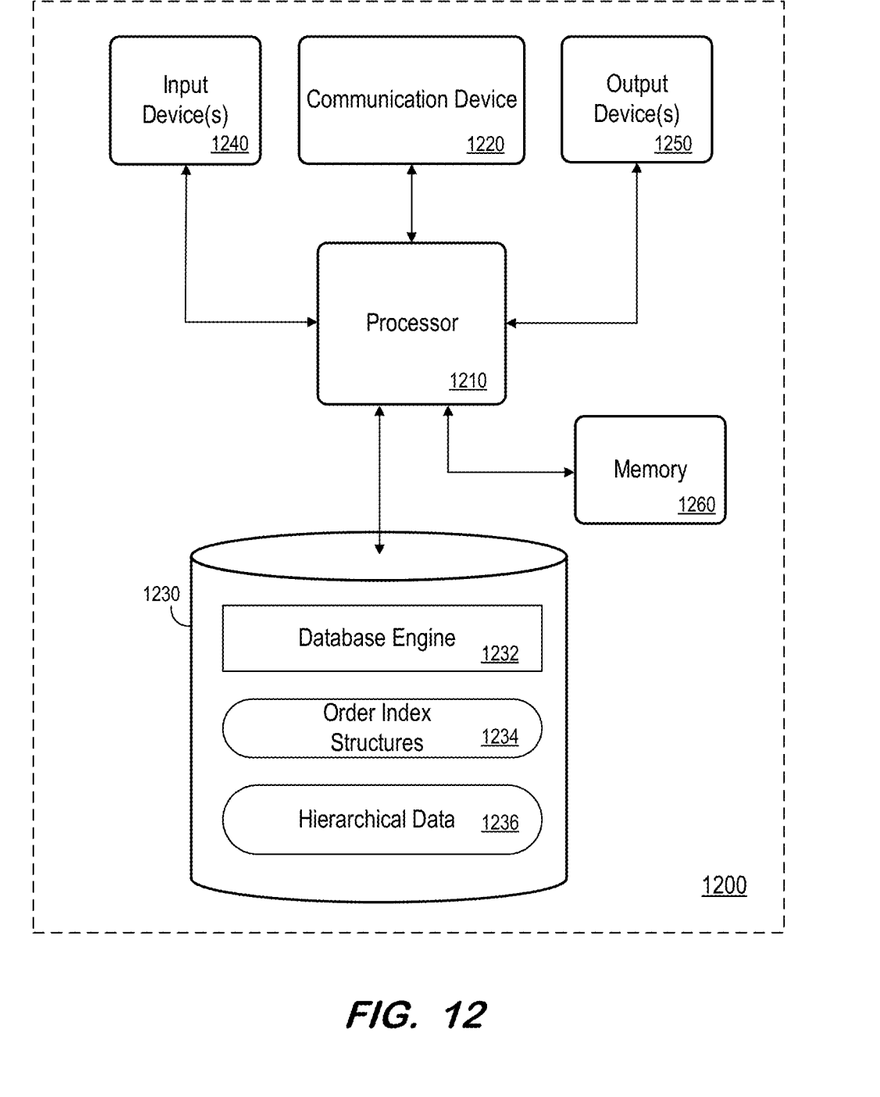
FIG. 12 is a block diagram of a computing system according to some embodiments.

FIG. 12 is a block diagram of system 1200 according to some embodiments. System 1200 may comprise a general-purpose computing system and may execute program code to perform any of the processes described herein. System 1200 may comprise an implementation of database 100 according to some embodiments. System 1200 may include other unshown elements according to some embodiments.

System 1200 includes processor 1210 operatively coupled to communication device 1200, data storage device 1230, one or more input devices 1240, one or more output devices 1250 and memory 1260. Communication device 1200 may facilitate communication with external devices, such as a reporting client, or a data storage device. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to enter information into apparatus 1200. Output device(s) 1250 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, etc., while memory 1260 may comprise Random Access Memory (RAM).

Database engine 1232 may comprise program code executed by processor 1210 to cause apparatus 1200 to perform any one or more of the processes described herein. Embodiments are not limited to execution of these processes by a single apparatus. Order index structures 1234 and hierarchical data 1236 may be implemented as described above. As also described above, database 100 may be implemented using volatile memory such as memory 1260. Data storage device 1230 may also store data and other program code for providing additional functionality and/or which are necessary for operation of system 1200, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Any of the methods described above may be implemented by processing units executing processor-executable program code stored in a memory. Processing units as described herein may be processors, processor cores, multi-core processors, etc.

Actual implementations may include software elements, hardware elements, or any combination thereof. For example, a system may be implemented using any number of computing devices, and one or more processors within the system may execute program code to cause corresponding computing devices to perform processes described herein.

Generally, each logical element described herein may be implemented by any number of devices coupled via any number of public and/or private networks. Two or more of such devices may be located remote from one another and may communicate with one another via any known manner of network(s) and/or via a dedicated connection.

Embodiments described herein are solely for the purpose of illustration. Those in the art will recognize other embodiments may be practiced with modifications and alterations to that described above.

What is claimed is:

1. A computing system comprising:
 a first memory storing processor-executable program code;
 a second memory storing data of a hierarchy, where each node of the hierarchy is represented by a row in a table, and the table includes columns, wherein a first number of rows represented by a first block located at a first level of a BO-Tree is different from a second number of rows represented by a second block located at a second level of the BO-Tree, and wherein for each row of the table: (1) a level column includes the level of its respective node, (2) a lower bound column includes a pointer to a lower bound entry for its respective node in an order index structure associated with the hierarchy, and (3) an upper bound column includes a pointer to an upper bound entry for its respective node in the order index structure associated with the hierarchy, wherein the lower bound entry and the upper bound entry correspond to an entry in the ordered data structure that maintains the relative order of the entry; and
 a processor to execute the processor-executable program code in order to cause the computing system to:

receive a pointer l, wherein the pointer is a back-link from a table row to an order index structure entry, wherein the order index structure is the BO-Tree of blocks, each of the blocks representing one or more of the rows, and each of the blocks including a block level and a pointer to its parent block; and determine an entry e of the order index structure to which the received pointer l points.

2. A computing system according to claim 1, wherein the order index structure is a doubly-linked list of blocks, each of the blocks representing two or more of the rows, and each of the blocks including a level of the block.

3. A computing system according to claim 2, wherein a first number of rows represented by a first block including a first level is different from a second number of rows represented by a second block including a second level.

4. A computing system according to claim 1, wherein the pointer l comprises a block pointer and a key, wherein each entry e is associated with a block pointer and includes a local key.

5. A computing system according to claim 1, wherein two or more entries $e_1$ $e_2$ are associated with a same block pointer.

6. A non-transitory computer-readable medium storing program code, the program code executable by a processor of a computing system to cause the computing system to:

store data of a hierarchy, where each node of the hierarchy is represented by a row in a table, and the table includes columns, wherein a first number of rows represented by a first block located at a first level of the BO-Tree is different from a second number of rows represented by a second block located at a second level of the BO-Tree, and wherein for each row of the table: (1) a level column includes the level of its respective node, (2) a lower bound column includes a pointer to a lower bound entry for its respective node in an order index structure associated with the hierarchy, and (3) an upper bound column includes a pointer to an upper bound entry for its respective node in the order index structure associated with the hierarchy, wherein the lower bound entry and the upper bound entry correspond to an entry in the ordered data structure that maintains the relative order of the entry;

receive a pointer l, wherein the pointer is a back-link from a table row to an order index structure entry, wherein the order index structure is a BO-Tree of blocks, each of the blocks representing one or more of the rows, and each of the blocks including a block level and a pointer to its parent block; and determine an entry e of the order index structure to which the received pointer l points.

7. A medium according to claim 6, wherein the order index structure is a doubly-linked list of blocks, each of the blocks representing two or more of the rows, and each of the blocks including a level of the block.

8. A medium according to claim 7, wherein a first number of rows represented by a first block including a first level is different from a second number of rows represented by a second block including a second level.

9. A medium according to claim 6, wherein the pointer l comprises a block pointer and a key, wherein each entry e is associated with a block pointer and includes a local key, and wherein two or more entries $e_1$ $e_2$ are associated with a same block pointer.

10. A computer-implemented method comprising:

storing data of a hierarchy, where each node of the hierarchy is represented by a row in a table, and the table includes columns, wherein a first number of rows represented by a first block located at a first level of the BO-Tree is different from a second number of rows represented by a second block located at a second level of the BO-Tree, and wherein for each row of the table: (1) a level column includes the level of its respective node, (2) a lower bound column includes a pointer to a lower bound entry for its respective node in an order index structure associated with the hierarchy, and (3) an upper bound column includes a pointer to an upper bound entry for its respective node in the order index structure associated with the hierarchy, wherein the lower bound entry and the upper bound entry correspond to an entry in the ordered data structure that maintains the relative order of the entry;

receiving a pointer l, wherein the pointer is a back-link from a table row to an order index structure entry, wherein the order index structure is a BO-Tree of blocks, each of the blocks representing one or more of the rows, and each of the blocks including a block level and a pointer to its parent block; and determining an entry e of the order index structure to which the received pointer l points.

11. A method according to claim 10, wherein the order index structure is a doubly-linked list of blocks, each of the blocks representing two or more of the rows, and each of the blocks including a level of the block.

12. A method according to claim 10, wherein a first number of rows represented by a first block including a first level is different from a second number of rows represented by a second block including a second level.

13. A method according to claim 10, wherein the pointer l comprises a block pointer and a key.

14. A method according to claim 13, wherein each entry e is associated with a block pointer and includes a local key, and wherein two or more entries $e_1$ $e_2$ are associated with a same block pointer.

* * * * *